US009781487B2

(12) United States Patent
Lin et al.

(10) Patent No.: US 9,781,487 B2
(45) Date of Patent: Oct. 3, 2017

(54) STREAMING MULTICAST CONTENT TO A TELEVISION VIA A MOBILE DEVICE

(71) Applicant: Cellco Partnership, Basking Ridge, NJ (US)

(72) Inventors: Te-Sheng Lin, Cresskill, NJ (US); John Gu, Rockaway, NJ (US); Xin Ren, Warren, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 50 days.

(21) Appl. No.: 13/903,286

(22) Filed: May 28, 2013

(65) Prior Publication Data

US 2014/0359672 A1  Dec. 4, 2014

(51) Int. Cl.
*H04N 21/6405* (2011.01)
*H04N 21/61* (2011.01)
*H04N 21/442* (2011.01)

(52) U.S. Cl.
CPC ... *H04N 21/6405* (2013.01); *H04N 21/44209* (2013.01); *H04N 21/6131* (2013.01)

(58) Field of Classification Search
CPC ......... H04N 21/41407; H04N 21/6131; H04N 21/4126; H04N 21/4622; H04N 21/4122; H04N 21/43637; H04N 21/44227; H04N 21/6405; H04N 21/44209; H04N 21/4131; H04N 21/42222; H04N 21/42224; H04N 21/47217; H04N 21/485; H04N 5/4403; H04N 21/440218; H04N 21/440263; H04N 21/47202; H04N 21/482; H04N 21/43615; H04N 21/4516; H04N 19/40; H04N 21/4402; H04L 12/2898; H04M 1/7253; H04M 1/72533
USPC .......................................................... 725/62
See application file for complete search history.

(56) References Cited

U.S. PATENT DOCUMENTS

| | | | |
|---|---|---|---|
| 7,899,492 B2 * | 3/2011 | Wang ................. | H04N 21/4122 455/556.1 |
| 7,957,733 B2 * | 6/2011 | Wang ................... | G06Q 10/087 455/414.1 |
| 8,805,358 B2 * | 8/2014 | Wang ................... | G06Q 10/087 455/414.1 |
| 8,863,223 B2 * | 10/2014 | Abbruzzese ........... | G11B 5/584 345/1.1 |

(Continued)

OTHER PUBLICATIONS

Wikipedia, Slingbox, http://en.wikipedia.org/wiki/Slingbox, May 15, 2013, 5 pages.

(Continued)

*Primary Examiner* — Benjamin R Bruckart
*Assistant Examiner* — Jen-Shi Huang

(57) ABSTRACT

A device may receive information that identifies available content associated with multicast streams available for transmission via a network. The device may determine content selected from the available content. The selected content may be associated with a multicast stream available for transmission via the network. The device may receive the multicast stream associated with the selected content via an air interface. The device may process the multicast stream into a format compatible with a connection interface. The device may output the processed multicast stream to a display device, that is different from the device, via the connection interface.

20 Claims, 8 Drawing Sheets

(56) References Cited

U.S. PATENT DOCUMENTS

| | | | |
|---|---|---|---|
| 2005/0277872 A1* | 12/2005 | Colby | A61B 5/0022 604/67 |
| 2006/0259942 A1* | 11/2006 | Toyama | H04M 1/72527 725/133 |
| 2007/0061725 A1* | 3/2007 | Isaac | H04N 7/17318 715/717 |
| 2007/0258011 A1* | 11/2007 | Tachikawa | G06F 9/4446 348/569 |
| 2008/0263621 A1* | 10/2008 | Austerlitz | H04N 21/43615 725/139 |
| 2008/0268829 A1* | 10/2008 | Taylor | H04H 60/65 455/420 |
| 2009/0138921 A1* | 5/2009 | Miyata | H04L 12/2812 725/80 |
| 2010/0058427 A1* | 3/2010 | Ansari | 725/131 |
| 2010/0060784 A1* | 3/2010 | Ansari | H04N 21/4126 348/441 |
| 2010/0169935 A1* | 7/2010 | Abbruzzese | 725/62 |
| 2010/0251292 A1* | 9/2010 | Srinivasan | H04H 20/57 725/37 |
| 2011/0242430 A1* | 10/2011 | Qi | H04N 21/4104 348/730 |
| 2012/0192230 A1* | 7/2012 | Algie | H04N 21/234309 725/38 |
| 2012/0240171 A1* | 9/2012 | Wang | G06Q 10/087 725/81 |
| 2013/0021535 A1* | 1/2013 | Kim | H04N 21/4122 348/738 |
| 2013/0113993 A1* | 5/2013 | Dagit, III | G06F 3/017 348/552 |
| 2013/0145403 A1* | 6/2013 | Sofos et al. | 725/62 |
| 2013/0339474 A1* | 12/2013 | Picker | H04N 21/43615 709/217 |

OTHER PUBLICATIONS

Alberto Canal, "TVEverywhere? We're getting there—Verizon Forums", http://forums.verizon.com/t5/Verizon-at-Home/TV-Everywhere-We-re-getting-there/ba-p/393677, Jan. 12, 2012, 3 pages.

Mark Milian, "Verizon takes steps toward launching TV Everywhere service", http://www.cnn.com/2011/TECH/mobile/01/07/verizon.tv.everywhere/index.html, Jan. 7, 2011, 4 pages.

Brian Klug, LTE Broadcast (EMBMS) Shown Running on Verizon's Band 4 LTE on Qualcomm Hardware, http://www.anandtech.com/sh ow/6635/lte-broadcast-embms-shown-running-on-verizons-band-4-lte-on-qualcomm-hardware, Jan. 11, 2013, 4 pages.

* cited by examiner

STREAMING MULTICAST CONTENT TO A TELEVISION VIA A MOBILE DEVICE

BACKGROUND

Mobile devices, such as smart phones, may receive evolved multimedia broadcast multicast services ("eMBMS") and unicast services. Transmitting content via eMBMS allows the content to be sent once and received by multiple devices. Unicast services transmit content multiple times, once to each unique destination address associated with a mobile device.

DETAILED DESCRIPTION

The following detailed description of example implementations refers to the accompanying drawings. The same reference numbers in different drawings may identify the same or similar elements.

A user of a mobile device, such as a smart phone, may desire to view content when a set-top box is unavailable or when the user is outside of the user's programming area. The user may prefer to watch content on a display device, such as a television, with a larger screen than that of a mobile device. Content may be bandwidth intensive and simultaneous unicasting of content to multiple mobile devices may cause network congestion. Thus, multicasting may allow content streaming to multiple devices with reduced effect on bandwidth usage. Implementations described herein may assist a user in viewing multicast content on an available display device when a set-top box is unavailable or when the user is outside of the user's programming area.

Figure 1:
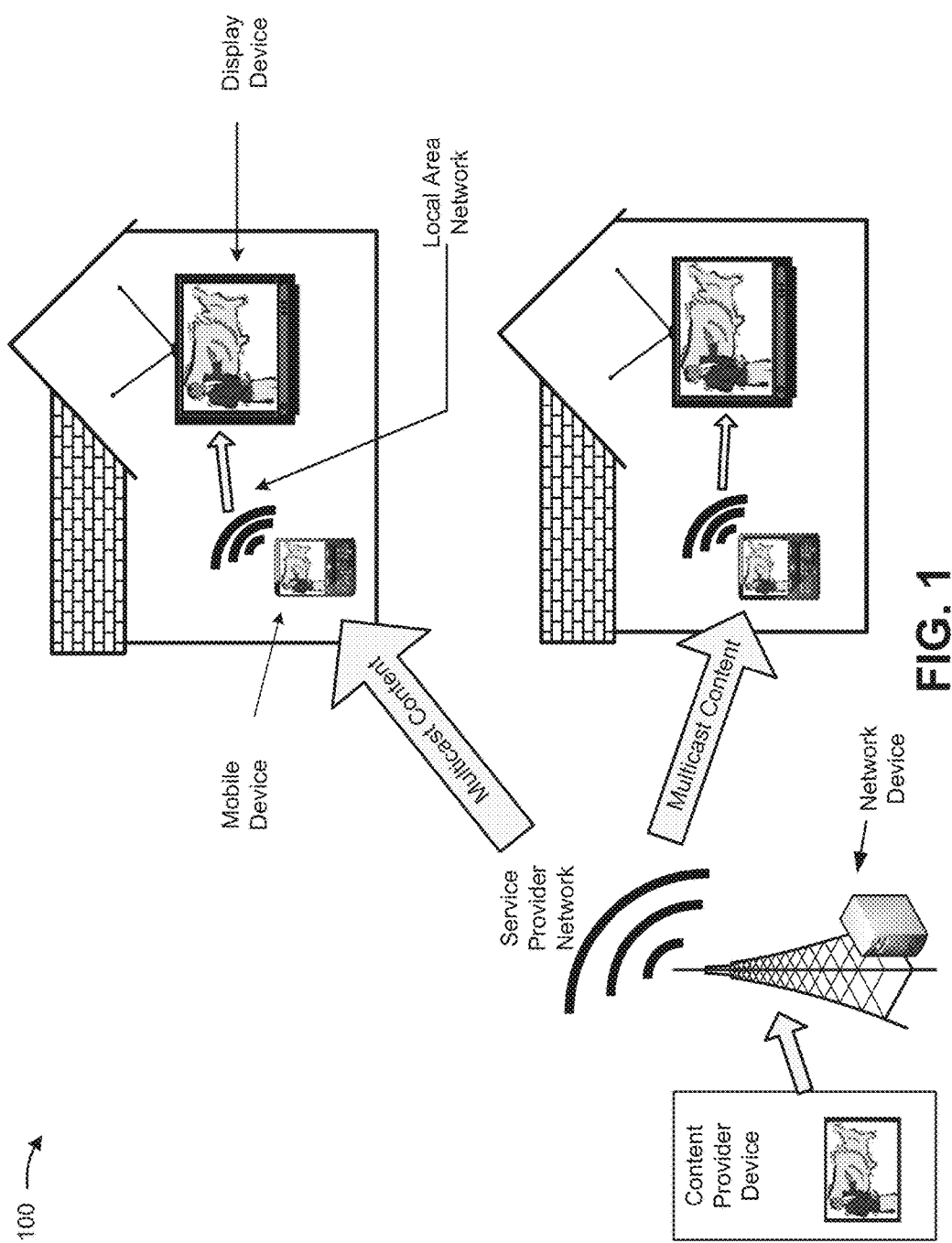
FIG. 1 is a diagram of an overview of an example implementation described herein.

FIG. 1 is a diagram of an overview of an example implementation 100 described herein. As shown in FIG. 1, example implementation 100 may include a content provider device, a network device, a service provider network, a mobile device, a local area network, and a display device. The mobile device may connect to the service provider network, such as a long term evolution ("LTE") network utilizing eMBMS. The mobile device may receive a list of available content associated with data streams being transmitted via the eMBMS network, such as multicast data streams provided by the content provider device. For example, the mobile device may receive a list of television channels available for multicast streaming. A user may select a particular channel, and the mobile device may process the multicast data stream to select a stream associated with the particular channel. The mobile device may process the multicast stream. For example, the mobile device may decrypt, decode, and/or transcode the stream. The mobile device may output content, such as the processed stream, via a connection interface for display on the display device. For example, the mobile device may output the processed stream via a local area network ("LAN"), a personal area network ("PAN"), a high-definition media interface ("HDMI") micro to HDMI cable, a mobile hotspot connection, or the like. The mobile device may detect, via a local area network, a display device, and may mirror information, displayed on a display screen of the mobile device, onto the display device.

As further shown in FIG. 1, the mobile device may be one of multiple mobile devices connected to the eMBMS network. A network device may measure network conditions, such as bandwidth capacity, achievable throughputs, user demand, or the like. The network device may determine, based on the network conditions, whether to transmit content via unicast or multicast delivery. For example, where multiple mobile devices are accessing the same stream, the network device may deliver content via multicast delivery. The mobile device may receive a signal from the network device indicating whether the mobile device is to be tuned to a unicast or a multicast stream, and may tune to the indicated stream. In this way, the network may provide content to one or more mobile devices using efficient delivery techniques, and the mobile device may allow the user to view the content on a display device.

Figure 2:
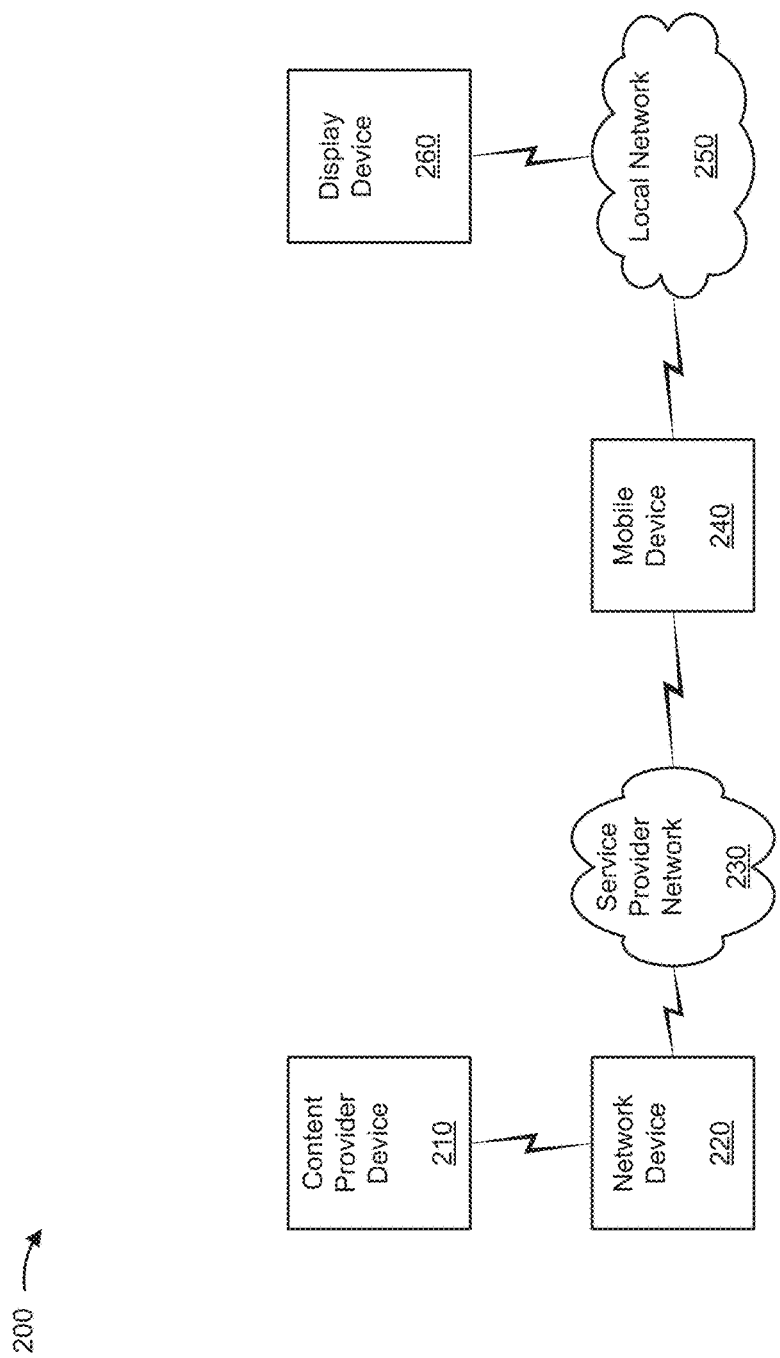
FIG. 2 is a diagram of the example environment in which systems and/or methods described herein may be implemented.

FIG. 2 is a diagram of an example environment 200 in which systems and/or methods described herein may be implemented. As shown in FIG. 2, environment 200 may include a content provider device 210, a network device 220, a service provider network 230, a mobile device 240, a local network 250, and a display device 260. Devices of environment 200 may interconnect via wired connections, wireless connections, or a combination of wired and wireless connections.

Content provider device 210 may include one or more devices capable of receiving, generating, processing, storing, and/or providing content, such as content associated with audio and/or visual streaming. For example, content provider device 210 may include one or more storage and/or communication devices, such as a content server associated with a cable service provider, a video-on-demand content provider, and/or a television network. Content provider device 210 may send available content to network device 220 for transmission to mobile device 240. In some implementations, content provider device 210 may receive a request for available content from network device 220 and/or mobile device 240.

Network device 220 may include one or more devices capable of receiving, generating, processing, storing, and/or providing information associated with available content and/or a network condition of service provider network 230. For example, network device 220 may include a base station, a server providing network monitoring services (e.g., bandwidth monitoring, achievable throughput, user demand, etc.), and/or a server providing streaming content. In some implementations, network device 230 may receive information from and/or transmit information to a mobile device 240 via service provider network 230. In some implementations, network device 220 may receive available content from content provider device 210, and may transmit the available content via an air interface to mobile device 240.

In some implementations, network device 220 may transmit data streams via a point-to-point and/or a point-to-multipoint transmission protocol. For example, network device 220 may transmit data streams using one or more multicast and/or unicast transmissions. In some implementations, network device 220 may utilize moving picture experts group ("MPEG") dynamic adaptive streaming over hypertext threaded protocol ("DASH") transmission, may use file delivery over unidirectional transport ("FLUTE") with forward error correction ("FEC") file download, and/or may use high efficiency video coding ("HEVC") or advanced video coding ("AVC") content encoding.

Service provider network 230 may include one or more wired and/or wireless networks. For example, service provider network 230 may include a cellular network (e.g., a long term evolution ("LTE") network, a multicast-broadcast single frequency network ("MBSFN"), etc.), a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. In some implementations, service provider network 230 may include an LTE network utilizing eMBMS.

Mobile device 240 may include one or more devices capable of receiving, generating, processing, storing, and/or providing information associated with available content streams. For example, mobile device 240 may include a mobile phone (e.g., a smart phone), a tablet computer, a laptop computer, a mobile Wi-Fi hotspot, or a similar device. Mobile device 240 may include one or more communication interfaces to receive available content via service provider network 230 and to transmit content via local network 250. For example, mobile device 240 may include an LTE antenna, an HDMI-micro port, and/or a Wi-Fi adapter capable of hotspot tethering. In some implementations, mobile device 240 may include a touch screen display that allows a user to provide input to mobile device 240. In some implementations, mobile device 240 may include a communication interface for receiving transmission mode information from network device 220 and/or for receiving playback control information from display device 260.

Local network 250 may include one or more wired and/or wireless networks. For example, local network 250 may include a local area network ("LAN") (e.g., an Ethernet network, an HDMI cable, or the like), a personal area network ("PAN") (e.g., a short-wavelength radio network, such as a Bluetooth network or another network based on frequency-hopping spread spectrum radio technology), a wireless local area network ("WLAN") (e.g., a Wi-Fi network or another network based on the Institute of Electrical and Electronics Engineers (IEEE) 802.11 standards, a WiMAX network or another network based on the IEEE 802.16 standards), an ultra-wideband network, an ad hoc network, or another type of network. Local network 250 may facilitate a data transfer from mobile device 240 to display device 260. In some implementations, local network 250 may facilitate the transfer of playback control information between display device 260 and mobile device 240.

Display device 260 may include a device capable of receiving, generating, processing, storing, and/or providing streaming content. For example, display device 260 may include a television, a computer monitor, a projector, a loudspeaker, a set of headphones, a set of Bluetooth wireless headphones, a head-mounted display, a three-dimensional display, a wireless streaming device (e.g., an Apple AirPlay device), a digital media receiver ("DMR"), and/or a digital living network alliance ("DLNA") universal plug and play ("UPnP") device.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
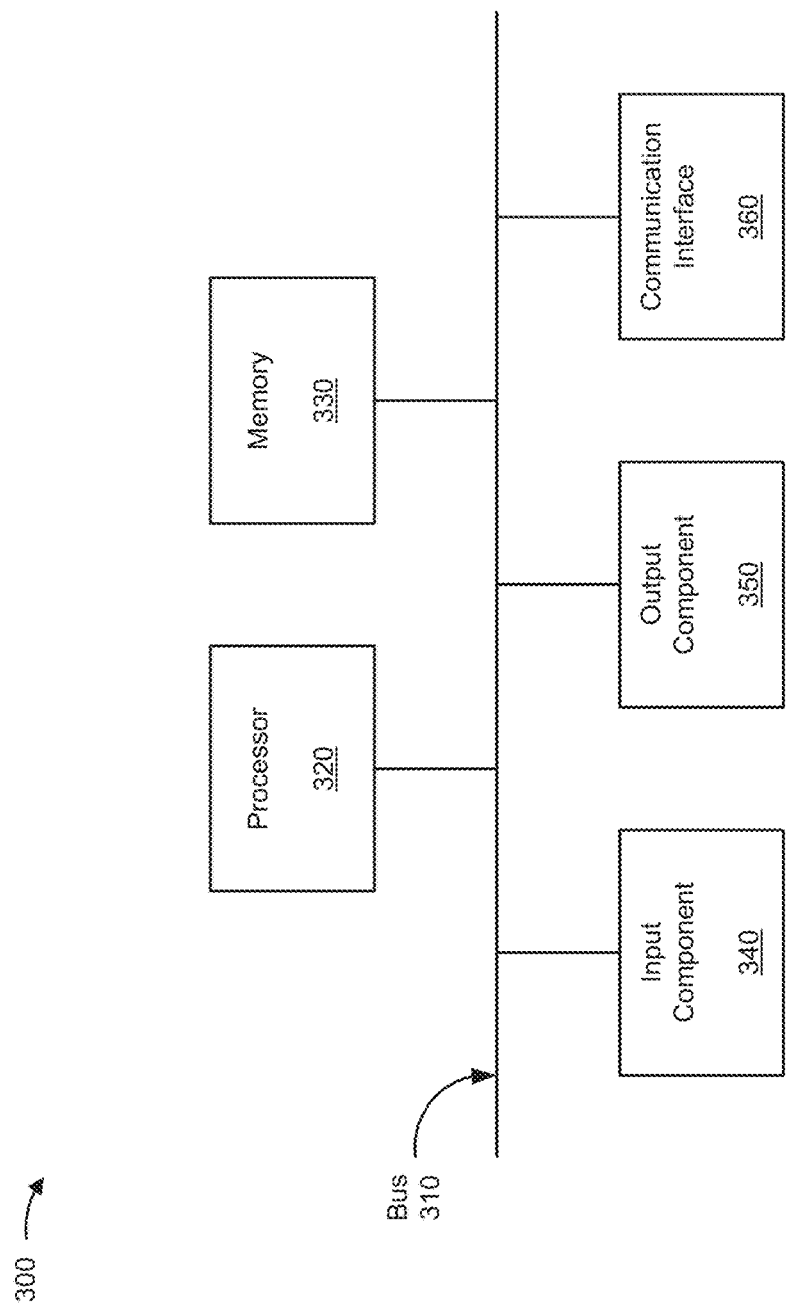
FIG. 3 is a diagram of example components of one or more devices of FIG. 2.

FIG. 3 is a diagram of example components of a device 300. Device 300 may correspond to content provider device 210, network device 220, mobile device 240, and/or display device 260. Additionally, or alternatively, each of content provider device 210, network device 220, mobile device 240, and/or display device 260 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320. For example, in some implementations, memory 330 may buffer content and/or store downloaded content for offline access.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a global positioning system ("GPS") interface, a hotspot tethering interface, a Bluetooth interface, a universal serial bus ("USB") interface, an HDMI interface, a wireless streaming video interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. For example, when device 300 corresponds to mobile device 240, device 300 may include a GPS component that facilitates the identification of a geographic location of mobile device 240, and/or a tethering component that facilitates the transmission of content to display device 260 via local network 250.

Figure 4:
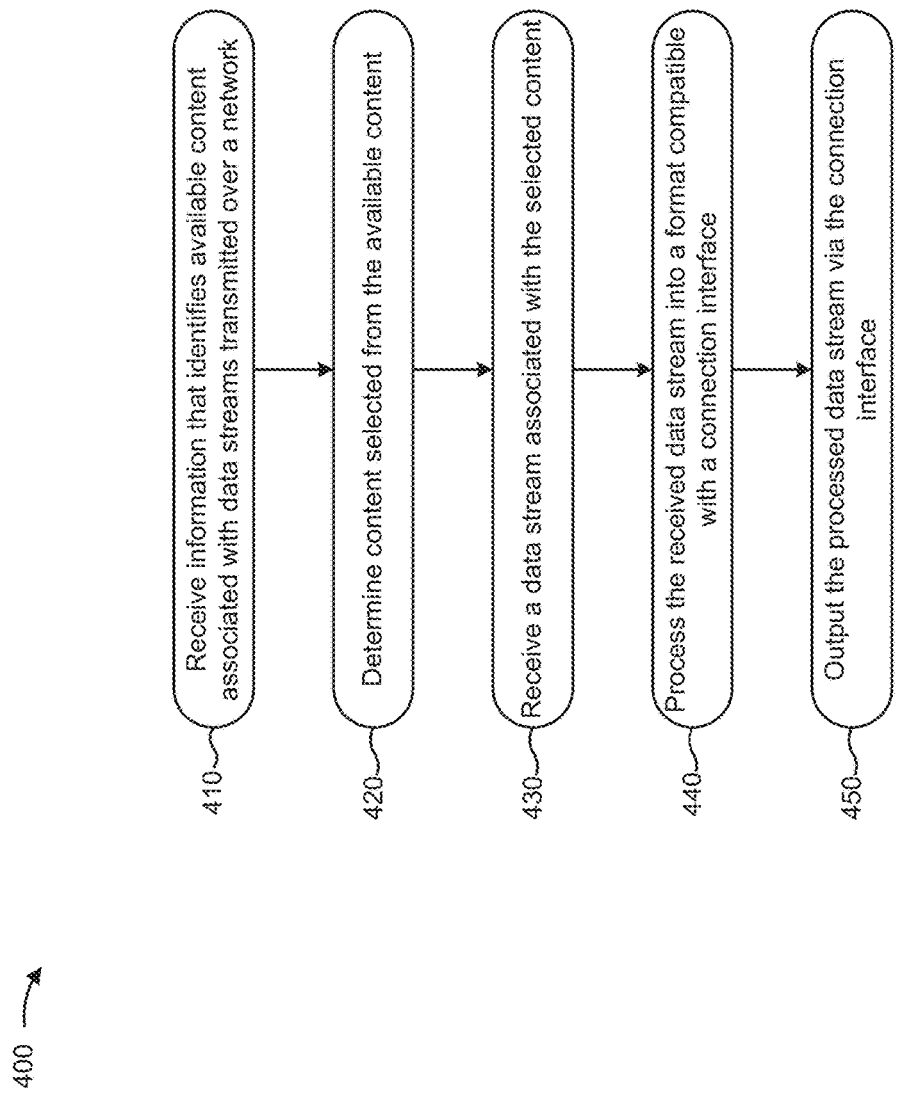
FIG. 4 is a flow chart of an example process for receiving available content via an eMBMS network and outputting the content via a connection interface.

FIG. 4 is a flow chart of an example process 400 for receiving available content via an eMBMS network and outputting the content via a connection interface. In some implementations, one or more process blocks of FIG. 4 may be performed by mobile device 240. Additionally or alternatively, one or more process blocks of FIG. 4 may be performed by another device or a group of devices separate from or including mobile device 240, such as content provider device 210, network device 220, and/or display device 260.

As shown in FIG. 4, process 400 may include receiving information that identifies available content associated with data streams transmitted over a network (block 410). For example, mobile device 240 may receive input, from content provider device 210, indicating available content that may be accessed by mobile device 240. The content may include a video communication (e.g., a movie, a television show, a sporting event, a commercial, etc.), an audio communication (e.g., a song, a radio program, a concert, etc.), a textual communication (e.g. a document, a short message service ("SMS") text message, etc.), or the like.

In some implementations, mobile device 240 may request information, identifying available content, from network device 220. For example, mobile device 240 may receive information identifying available content from network device 220 via service provider network 230. In some implementations, mobile device 240 may store available content and data stream information locally. Data stream information may include information that indentifies a source internet protocol ("IP") address for an associated data stream.

In some implementations, a user of mobile device 240 may input one or more preferences for receiving information associated with available content by mobile device 240. In this case, mobile device 240 may request available content information based on a preference. The preference may indicate a source of the content available to mobile device 240. For example, mobile device 240 may receive information identifying content from a pre-specified content provider device 210. In some implementations, the preference may be based on a type of content available to mobile device 240. For example, mobile device 240 may receive information identifying a type of content, such as movies, sports, news, or the like.

In some implementations, the preference may indicate a geographic content location available to mobile device 240, such as a home location. For example, mobile device 240 may receive information identifying a geographic content location, such as Washington, D.C., and mobile device 240 may retrieve local content associated with that location. In this case, mobile device 240 may request information identifying content from content provider devices 210 associated with the preferred geographic location.

As further shown in FIG. 4, process 400 may include determining content selected from the available content (block 420). For example, mobile device 240 may receive input (e.g., from a user of mobile device 240 and/or from another device, such as content provider device 210, network device 220, and/or display device 260) indicating that mobile device 240 is to receive a data stream associated with the selected content. In some implementations, mobile device 240 may provide a user with an electronic programming guide ("EPG"). For example, a user may use the EPG to provide input identifying the content that the user wants to receive. In some implementations, display device 260 may instruct mobile device 240 to select from the available content. For example, a user may use a remote control associated with display device 260 to select content, and display device 260 may provide information identifying the content to mobile device 240.

As further shown in FIG. 4, process 400 may include receiving a data stream associated with the selected content (block 430). In some implementations, mobile device 240 may use data stream information to subscribe to an underlying data stream. For example, mobile device 240 may use a device identifier such as an IP address, to request content from a particular content provider device 210.

In some implementations, the data stream may include a point-to-multipoint data stream, such as a multicast data stream or a broadcast data stream. The point-to-multipoint data stream may be provided by a service provider network 230 utilizing LTE eMBMS. For example, mobile device 240 may receive a multicast transmission from network device 220. A multicast transmission may refer to a single transmission from network device 220 that may be selectively received by multiple mobile devices on the network listening for a transmission using a particular multicast address. Additionally or alternatively, mobile device 240 may receive a broadcast transmission from network device 220. A broadcast transmission may refer to a single transmission from network device 220 that may be received by multiple mobile devices on the network.

In some implementations, the data stream may include a point-to-point data stream, such as a unicast data stream. For example, mobile device 240 may receive a unicast transmission from network device 220. A unicast transmission may refer to a single transmission from network device 220 to a single mobile device 240. In some implementations, where mobile device 240 requests more than one data stream, mobile device 240 may receive a point-to-point and a point-to-multipoint stream. For example, mobile device 240 may request a first data stream that is already being multicast by network device 220, and may request a second data stream that is not being transmitted by network device 220. In this case, mobile device 240 may receive the first data stream already being multicast, and may receive instructions to receive the second data stream via a unicast transmission.

As further shown in FIG. 4, process 400 may include processing the received data stream into a format compatible with a connection interface (block 440). For example, mobile device 240 may process the received data stream into a format that is different from the format with which the data stream was received. In some implementations, mobile device 240 may de-crypt, de-code, and/or transcode the received data stream. In some implementations, mobile device 240 may remove and/or authenticate digital rights management ("DRM") protection associated with the received data stream. In some implementations, mobile device 240 may decompress the received data stream. In some implementations, mobile device 240 may convert the received data stream into a format compatible with a connection interface. For example, mobile device 240 may receive input from a user and/or another device (e.g., display device 260) that identifies a setting (e.g., associated with local network 250, display device 260, etc.), and may process the stream based on the setting. The setting may include a connection interface format, a volume, a video quality, an aspect ratio, etc. In some implementations, the format compatible with the connection interface may be an uncompressed format. In some implementations, the format compatible with the connection interface may be a format that is DLNA compatible. In some implementations, the format compatible with the connection interface may be a format that is compatible with local network 250.

In some implementations, a user may provide input to mobile device 240, and mobile device 240 may process the received data stream based on receiving the user input. Additionally, or alternatively, mobile device 240 may detect a connection with display device 260, and may process the received data stream based on the detected connection. For example, mobile device 240 may detect the resolution of display device 260, and may reformat the content to match the display. In some implementations, mobile device 240 may, based on the user input, store information associated with the detected connection, and may output the data stream based on the stored information. For example, mobile device 240 may, based on the user input, use stored information associated with the settings of display device 260 to automatically process the received data stream, and may automatically provide the processed data stream via local network 250 when a connection to display device 260 is detected.

As further shown in FIG. 4, process 400 may include outputting the processed data stream via the connection interface (block 450). For example, mobile device 240 may output the processed data stream via local network 250. In some implementations, mobile device 240 may output the processed data stream via a wired connection, such as an HDMI output. In some implementations, mobile device 240 may output the processed data stream via a wireless LAN/PAN, using DLNA streaming, using wireless media streaming protocols, or the like. Mobile device 240 may output the processed data stream to display device 260. In some implementations, mobile device 240 may buffer the processed data stream for a period of time. For example, mobile device 240 may store the processed data stream for offline output to display device 260.

In some implementations, mobile device 240 may output the processed data stream to multiple display devices. For example, mobile device 240 may output content to several televisions. In some implementations, mobile device 240 may output multiple processed data streams to multiple display devices. For example, mobile device 240 may receive more than one data stream and may process and output different data streams for viewing on different display devices. In this way, mobile device 240 may be used to connect to a data stream and provide content to display device 260, where display device 260 is separate from mobile device 240.

While a series of blocks has been described with respect to FIG. 4, the blocks and/or the order of the blocks may be modified in some implementations. Additionally, or alternatively, non-dependent blocks may be performed in parallel. Further, one or more blocks may be omitted.

Figure 5:
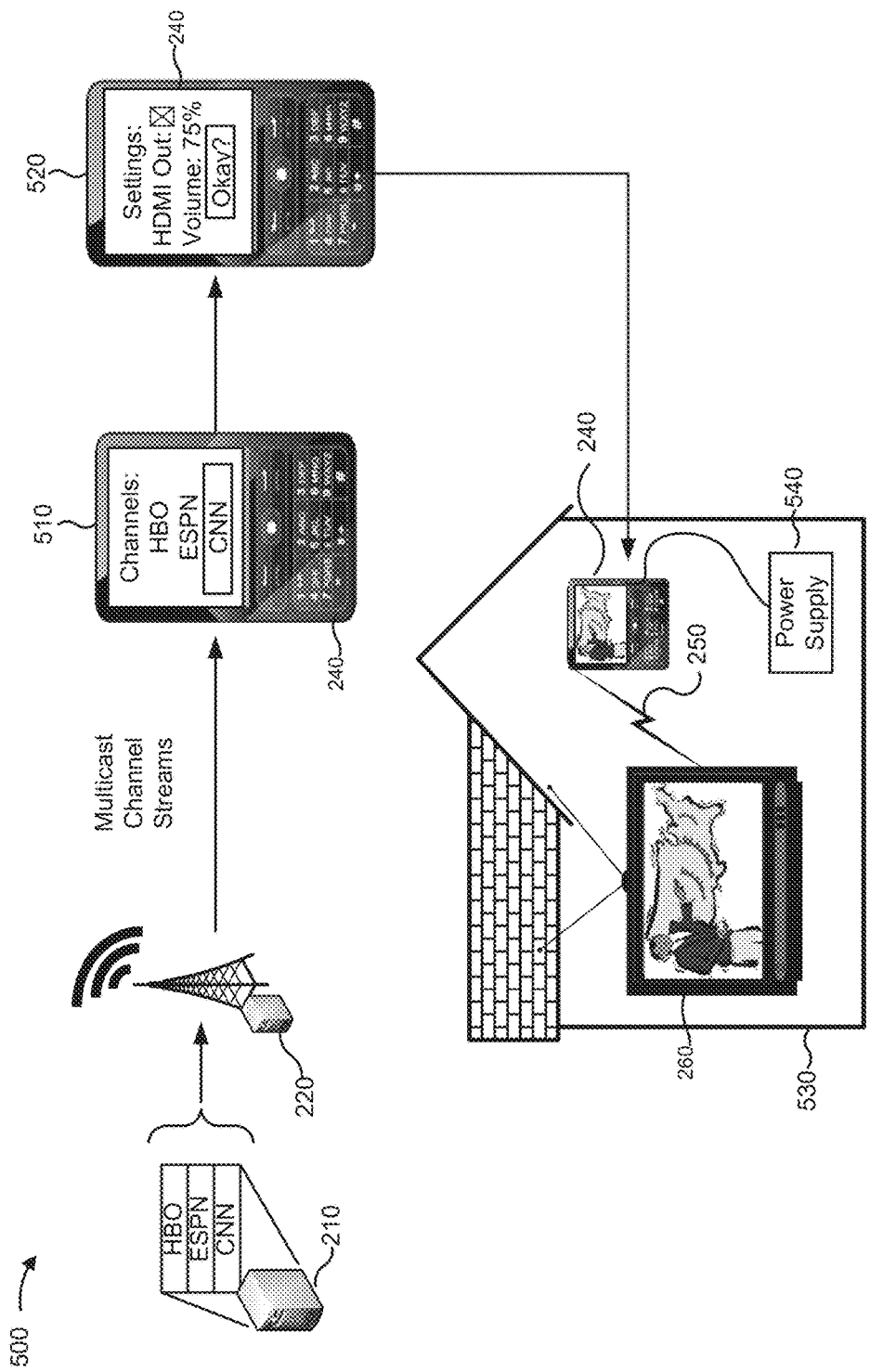
FIG. 5 is a diagram of an example implementation relating to the example process shown in FIG. 4.

FIG. 5 is a diagram of an example implementation 500 relating to process 400 shown in FIG. 4. As shown in FIG. 5, example implementation 500 may include a mobile device 240. Mobile device 240 may receive information about available content, provided by content provider device 210, from network device 220. For example, mobile device 240 may receive information about television channels available for multicast streaming. As shown by reference number 510, mobile device 240 may provide information identifying television channels, and may receive a selection of a particular television channel to stream. For example, a user may select a channel, such as CNN, associated with a data stream that mobile device 240 may process. As shown by reference number 520, mobile device 240 may determine a setting for processing the selected stream. For example, a user may input a setting associated with local network 250. The setting may correspond to a user preference, such as a connection interface format, a volume, a video quality, an aspect ratio, etc. As shown by reference number 530, mobile device 240 may output the processed stream to display device 260 via local network 250. For example, mobile device 240 may output the processed stream via an HDMI micro to HDMI cable connected to display device 260, based on a user preference indicating HDMI. As further shown in FIG. 5, mobile device 240 may connect to power supply 540. Power supply 540 may assure that delivery of the processed stream will not be interrupted by a drained battery of mobile device 240.

As indicated above, FIG. 5 is provided merely as an example. Other examples are possible and may differ from what was described with regard to FIG. 5.

Figure 6:
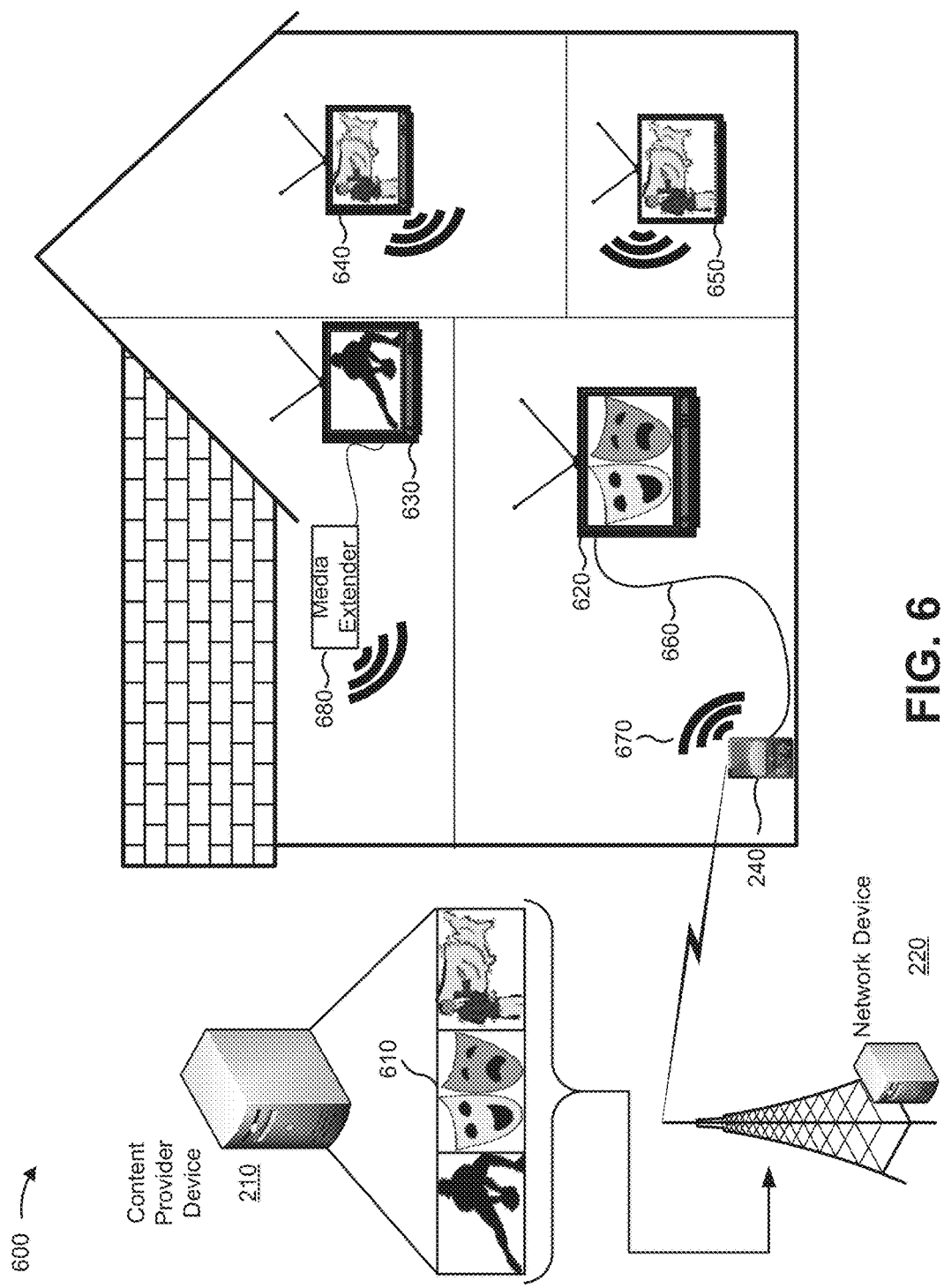
FIG. 6 is a diagram of an example implementation relating to the example process shown in FIG. 4.

FIG. 6 is a diagram of another example implementation 600 relating to process 400 shown in FIG. 4. In example implementation 600, mobile device 240 may receive multiple data streams from network device 220. As shown by reference number 610, mobile device 240 may receive a sports program, an entertainment program, and a news program being streamed concurrently. Mobile device 240 may capture the three data streams corresponding to the three programs. Mobile device 240 may process each stream.

As further shown in FIG. 6, mobile device 240 may output the processed streams to one or more devices. For example, mobile device 240 may output the entertainment program to a first display device 620, the sports program to a second display device 630, and the news program to a third display device 640 and a fourth display device 650. Display devices 620-650 may correspond to display device 260.

As further shown in FIG. 6, mobile device 240 may transmit the entertainment program to display device 620 via local network 660. For example, local network 660 may include an HDMI-micro to HDMI interface that may connect mobile device 240 to display device 620. As further shown in FIG. 6, mobile device 240 may transmit one or more processed streams to display device 630, display device 640, and/or display device 650 via local network 670. For example, local network 670 may include a wireless network, such as a Wi-Fi network. As shown by reference number 680, display device 630 may be connected to a wireless media extender (e.g., Apple AirPlay, DLNA UPnP DMR, etc.). Mobile device 240 may transmit the sports program to the wireless media extender, which may provide the sports program to display device 630 for display. As shown in FIG. 6, display device 640 and display device 650 may include connected televisions (e.g. a televisions with an integrated network connection), and may connect directly to local network 670. For example, mobile device 240 may transmit the news program to display device 640 and display device 650 via Wi-Fi.

As indicated above, FIG. 6 is provided merely as an example. Other examples are possible and may differ from what was described with regard to FIG. 6.

Figure 7:
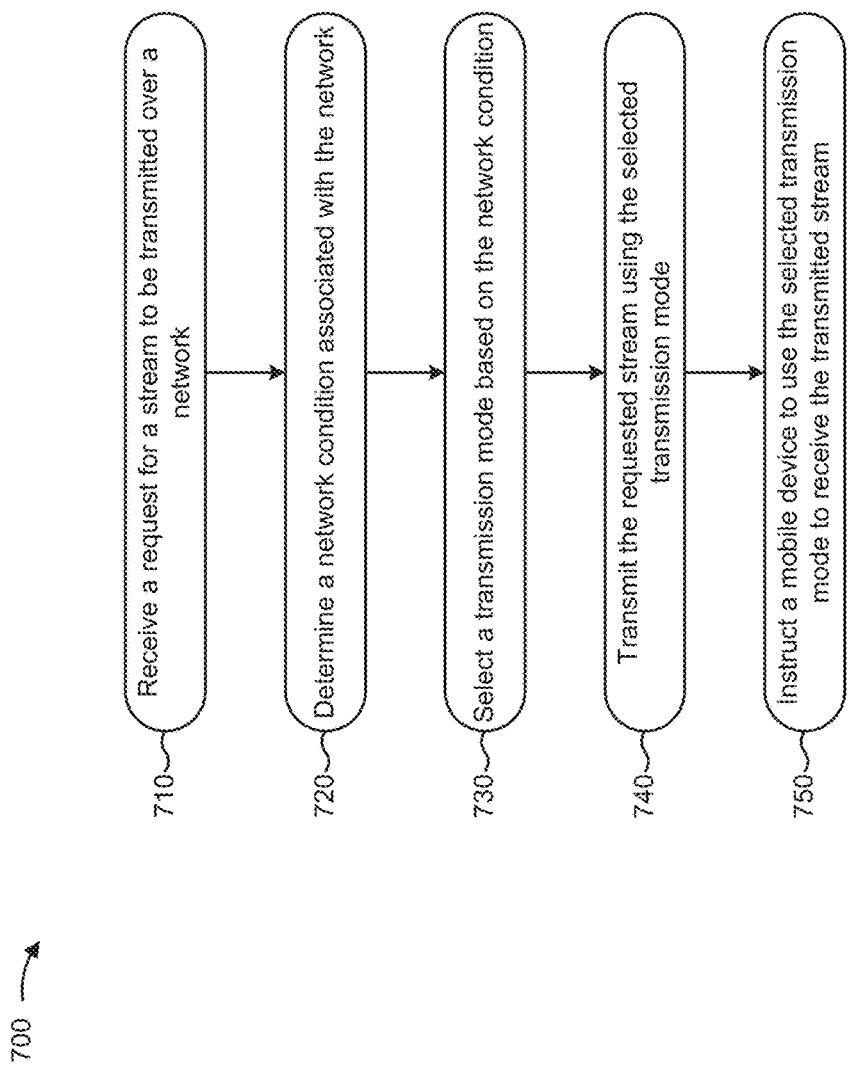
FIG. 7 is a flow chart of an example process for determining a transmission mode for transmitting requested content.

FIG. 7 is a flow chart of an example process for determining a transmission mode for transmitting requested content. In some implementations, one or more process blocks of FIG. 7 may be performed by network device 220. Additionally, or alternatively, one or more process blocks of FIG. 7 may be performed by another device or a group of devices separate from or including network device 220, such as content provider device 210, mobile device 240, and/or display device 260.

As shown in FIG. 7, process 700 may include receiving a request for a stream to be transmitted over a network (block 710). For example, network device 220 may receive a request from mobile device 240 to send a particular stream to mobile device 240 via service provider network 230.

As further shown in FIG. 7, process 700 may include determining a network condition associated with the network (block 720). For example, network device 220 may determine network conditions, such as bandwidth capacity, achievable throughputs, user demand, or the like, to determine an efficient transmission mode.

In some implementations, network device 220 may store the network condition. In some implementations, network device 220 may compare the network condition with past network conditions. For example, network device 220 may compare a current network condition against the stored network conditions to determine a projected network condition. In some implementations, network device 220 may receive information associated with the content requested for streaming by mobile device 240. For example, the content may be of a certain type, such as a live sporting event. Information associated with the requested content may be used to determine a projected network condition. If the projected network condition satisfies a threshold (e.g., a particular level of demand, a particular amount of utilized capacity, etc.), network device 220 may select a particular transmission mode.

In some implementations, the network condition may include a quantity of mobile devices 240 requesting the same stream. For example, network device 220 may determine a quantity of devices receiving a particular stream and/or a quantity of devices requesting the particular stream. If the quantity of devices satisfies a threshold (e.g., more than one, less than ten, etc.), network device 220 may select a particular transmission mode for transmitting the particular stream.

As shown in FIG. 7, process 700 may include selecting a transmission mode based on the network condition (block 730). For example, if the network condition satisfies a threshold, network device 220 may select a particular transmission mode for transmitting content. Particular transmission modes may include a point-to-point (e.g., unicast) mode or a point-to-multipoint (e.g., multicast, broadcast, etc.) mode. In some implementations, network device 220 may determine multiple transmission modes for transmitting to a single mobile device 240. For example, network device 220 may select a multicast transmission mode to send a first data stream to mobile device 240 and a unicast transmission mode to send a second data stream to mobile device 240. In some implementations, network device 220 may determine multiple transmission modes for transmitting the same content. For example, network device 220 may transmit a particular data stream via a multicast transmission mode and a unicast transmission mode. In this case, the data streams with different transmission modes may be received by different mobile devices 240, or may be received by a single mobile device 240.

In some implementations, network device 220 may receive a request for multiple streams. For example, network device 220 may be requested to transmit multiple streams concurrently. Network device 220 may iteratively determine network conditions. For example, network device 220 may determine a network condition, and may select a transmission mode for a first requested data stream before selecting a transmission mode for a second requested data stream. Alternatively, network device 220 may concurrently select transmission modes. For example, network device 220 may determine a projected network condition for multiple requested data streams before selecting a transmission mode for any one of the requested data streams.

In some implementations, network device 220 may receive a request for a second stream to be transmitted after network device 220 has selected a transmission mode for a first stream to a first mobile device 240. In some implementations, network device 220 may reselect a transmission mode for the first stream. For example, network device 220 may change the first stream to the first mobile device 240 from unicast to multicast if a second mobile device 240 requests the same content as the first mobile device 240. In this case, network device 220 may instruct the first mobile device 240 to use the new transmission mode.

As shown in FIG. 7, process 700 may include transmitting the requested stream via the selected transmission mode (block 740). For example, network device 220 may transmit the requested stream to mobile device 240 using the selected transmission mode. In some implementations, network device 230 may multicast a selected stream via an LTE eMBMS network using the selected transmission mode. In some implementations, network device 220 may transmit the requested stream via multiple transmission modes. For example, network device 220 may transmit a single program via a unicast and a multicast transmission mode. In some implementations, network device 220 may transmit the same content in multiple streams. For example, network device 220 may transmit the same content via multiple unicast streams to multiple mobile devices 240. Additionally, or alternatively, network device 220 may transmit the same content to some mobile devices 240 using unicast streams, and may transmit to other mobile devices 240 using multicast streams.

As further shown in FIG. 7, process 700 may include instructing a mobile device to use the selected transmission mode to receive the transmitted stream (block 750). For example, network device 220 may transmit, to mobile device 240, information associated with receiving the transmitted stream. This information associated with receiving the transmitted stream may include bearer channel identification, IP address information, or the like. In some implementations, network device 220 may transmit information associated with processing a data stream. For example, network device 220 may transmit information associated with decoding and/or decrypting the data stream.

While a series of blocks has been described with respect to FIG. 7, the blocks and/or the order of the blocks may be modified in some implementations. Additionally, or alternatively, non-dependent blocks may be performed in parallel. Further, one or more blocks may be omitted.

Figure 8B:
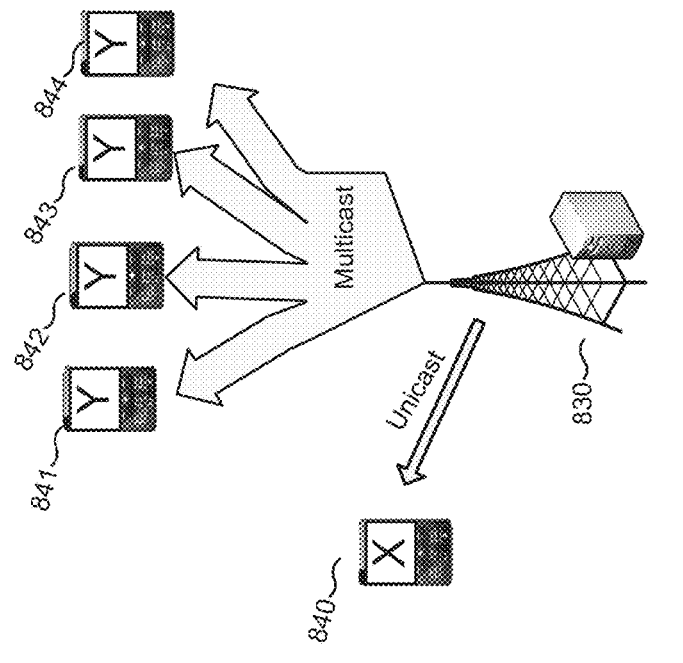
FIGS. 8A and 8B are diagrams of example implementations relating to the example process shown in FIG. 7.
Figure 8A:
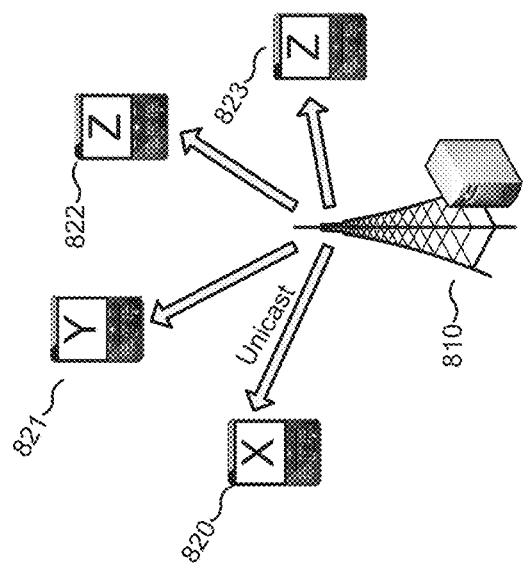

FIGS. 8A and 8B are diagrams of an example implementation 800 relating to process 700 shown in FIG. 7. As shown, example implementation 800 may include network devices 810 and 830, which may correspond to network device 220, and mobile devices 820-823 and 840-844, which may correspond to mobile device 240. As shown in FIG. 8A, network device 810 may determine a stream to transmit (e.g., streams associated with content "X," "Y," and "Z"). Network device 810 may determine a network condition, such as a quantity of mobile devices, 820-823, requesting programs X, Y, and Z. Network device 810 may transmit a stream based on the determined network condition, such as the number of mobile devices requesting content X, Y, and Z. Assuming that a threshold level for multicasting a data stream is more than two requests for the same content, network device 810 may unicast stream X to mobile device 820, may unicast stream Y to mobile device 821, and may unicast stream Z to mobile device 822 and mobile device 823.

As shown in FIG. 8B, network device 830 may determine a stream to transmit (e.g., streams associated with content "X" and "Y"). Network device 830 may determine a network condition, such as a quantity of mobile devices, 840-844, requesting content X and Y. Assuming that a threshold level for multicasting a data stream is more than two requests for the same content, network device 830 may unicast stream X to mobile device 840, and may multicast stream Y to mobile devices 841-844.

As indicated above, FIGS. 8A and 8B are provided merely as an example. Other examples are possible and may differ from what was described with regard to FIG. 8.

Implementations described herein may allow a network device to deliver content and reduce network congestion by determining a transmission mode with which to transmit content, such as unicast or multicast, based on network conditions. In so doing, the network device may enhance user experience by providing higher throughput of content to mobile devices. Furthermore, implementations described herein may assist a user in viewing content on a display device when a set-top box is unavailable or when the user is outside a particular programming area.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein. In some implementations, the user interfaces may be customizable by a user or a device. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A mobile device comprising:
one or more processors to:
receive information that identifies available content that is available for streaming via a network;
determine first content that is selected from the available content;
receive a first stream corresponding to the first content via a cellular network,
the network including the cellular network;
receive a second stream corresponding to second content via the cellular network while concurrently receiving the first stream via the cellular network;
receive information that identifies a connection interface between the mobile device and a first display device of a home,
the first display device of the home being distinct from the mobile device;
determine a first format that is compatible with the connection interface based on the information that identifies the connection interface;
convert, to obtain a first processed stream, the first stream corresponding to the first content into the first format that is compatible with the connection interface;
transmit, to the first display device of the home, the first processed stream via the connection interface;
determine a second format that is compatible with a wireless media extender that is connected to a second display device of the home,
the wireless media extender being distinct from the first display device of the home and the mobile device, and the second display device of the home being distinct from the wireless media extender, the first display device of the home, and the mobile device;
convert, to obtain a second processed stream, the second stream corresponding to the second content into the second format that is compatible with the wireless media extender; and
transmit, to the wireless media extender, the second processed stream via a local network of the home,
the second processed stream being used by the wireless media extender to provide the second content for display on the second display device of the home.

2. The mobile device of claim 1,
where the one or more processors are further to:
receive input identifying a type of content; and
where the one or more processors, when receiving information that identifies the available content, are to:
receive the information that identifies the available content based on the input identifying the type of content.

3. The mobile device of claim 1,
where the one or more processors are further to:
receive input identifying a source of content; and
where the one or more processors, when receiving information that identifies the available content, are to:
receive the information that identifies the available content based on the identified source of content.

4. The mobile device of claim 1, where the one or more processors are further to:
send the information that identifies the available content to the first display device; and
receive, from the first display device, particular information associated with determining the first content that is selected from the available content.

5. The mobile device of claim 1,
where the connection interface is a first connection interface; and
where the one or more processors are further to:
determine third content that is selected from the available content;
receive a third stream corresponding to the third content;
convert, to obtain a third processed stream, the third stream into a format compatible with a second connection interface; and
output the third processed stream via the second connection interface.

6. The mobile device of claim 5,
where the one or more processors, when outputting the third processed stream, are to:
output the third processed stream to a third display device.

7. The mobile device of claim 1, where the one or more processors, when receiving the information that identifies the connection interface, are to:
receive, from the first display device, the information that identifies the connection interface.

8. A method, comprising:
receiving, by a mobile device, information that identifies available content that is available for streaming via a network;
determining, by the mobile device, first content that is selected from the available content;
receiving, by the mobile device, a first stream corresponding to the first content via a cellular network,
the network including the cellular network;
receiving, by the mobile device, a second stream corresponding to second content via the cellular network while concurrently receiving the first stream via the cellular network;
receiving, by the mobile device, information that identifies a connection interface between the mobile device and a first display device of a home,
the first display device of the home being distinct from the mobile device;
determining, by the mobile device, a first format that is compatible with the connection interface based on the information that identifies the connection interface;
converting, by the mobile device and to obtain a first processed stream, the first stream corresponding to the first content into the first format that is compatible with the connection interface;
transmitting, by the mobile device and to the first display device of the home, the first processed stream via the connection interfaces;
determining, by the mobile device, a second format that is compatible with a wireless media extender that is connected to a second display device of the home,
the wireless media extender being distinct from the first display device of the home and the mobile device, and
the second display device of the home being distinct from the wireless media extender, the first display device of the home, and the mobile device;
converting, by the mobile device and to obtain a second processed stream, the second stream corresponding to the second content into the second format that is compatible with the wireless media extender; and
transmitting, by the mobile device and to the wireless media extender, the second processed stream via a local network of the home,
the second processed stream being used by the wireless media extender to provide the second content for display on the second display device of the home.

9. The method of claim 8, where the first stream includes at least one of:
a broadcast stream; or
a multicast stream.

10. The method of claim 8, further comprising:
receiving input identifying a type of content,
where receiving the information that identifies the available content comprises:
receiving the information that identifies the available content based on the type of content.

11. The method of claim 8, further comprising:
receiving input identifying a geographic location,
where receiving the information that identifies the available content comprises:
receiving the information that identifies the available content based on the identified geographic location.

12. The method of claim 8, where receiving the information that identifies the connection interface comprises:
receiving, from the first display device, the information that identifies the connection interface.

13. The method of claim 8,
where the connection interface is a first connection interface; and
where the method further comprises:
determining third content that is selected from the available content;
receiving a third stream corresponding to the third content;

converting, to obtain a third processed stream, the third stream into a format compatible with a second connection interface; and outputting the third processed stream via the second connection interface.

14. The method of claim 13,
where outputting the third processed stream comprises:
outputting the third processed stream to a third display device,
the third display device being different from the first display device.

15. A non-transitory computer-readable medium storing instructions, the instructions comprising:
one or more instructions that, when executed by at least one processor of a mobile device, cause the at least one processor to:
receive information that identifies available content that is available for streaming via a network;
identify first content of the available content;
receive a first stream corresponding to the first content via a cellular network,
the network including the cellular network;
receive a second stream corresponding to second content via the cellular network while concurrently receiving the first stream via the cellular network;
receive information that identifies a connection interface between the mobile device and a first display device of a home,
the first display device of the home being distinct from the mobile device;
determine a first format that is compatible with the connection interface based on the information that identifies the connection interface;
convert, to obtain a first processed stream, the first stream corresponding to the first content into the first format that is compatible with the connection interface;
transmit, to the first display device of the home, the first processed stream via the connection interface;
determine a second format that is compatible with a wireless media extender that is connected to a second display device of the home,
the wireless media extender being distinct from the first display device of the home and the mobile device, and
the second display device of the home being distinct from the wireless media extender, the first display device of the home, and the mobile device;
convert, to obtain a second processed stream, the second stream corresponding to the second content into the second format that is compatible with the wireless media extender; and
transmit, to the wireless media extender, the second processed stream via a local network of the home,
the second processed stream being used by the wireless media extender to provide the second content for display on the second display device of the home.

16. The non-transitory computer-readable medium of claim 15, where the one or more instructions to receive the information that identifies the available content comprise:
one or more instructions that, when executed by the at least one processor, cause the at least one processor to:
receive, from a user, an input that indicates one or more preferences,
the one or more preferences including information identifying one or more of a source of content or a type of content;
provide a request for the information that identifies the available content based on the input that indicates the one or more preferences; and
receive, as a response to the request, the information that identifies the available content.

17. The non-transitory computer-readable medium of claim 15, where the one or more instructions to identify the first content comprise:
one or more instructions that, when executed by the at least one processor, cause the at least one processor to:
provide an electronic programming guide for display;
receive an input via the electronic programming guide; and
identify the first content based on the input.

18. The non-transitory computer-readable medium of claim 15, where the one or more instructions to receive the first stream comprise:
one or more instructions that, when executed by the at least one processor, cause the at least one processor to:
identify a particular device that provides the first stream;
provide a request for the first content to the particular device; and
receive the first stream as a response to the request.

19. The non-transitory computer-readable medium of claim 15, where the first format is an uncompressed format or is digital living network alliance (DLNA) compatible.

20. The non-transitory computer-readable medium of claim 15,
where the connection interface is a first connection interface, and
where the instructions further comprise:
one or more instructions that, when executed by the at least one processor, cause the at least one processor to:
identify third content;
receive a third stream corresponding to the third content;
convert, to obtain a third processed stream, the third stream into a format compatible with a second connection interface; and
output the third processed stream via the second connection interface.

* * * * *